US008668224B2

(12) United States Patent
Taniguchi et al.

(10) Patent No.: US 8,668,224 B2
(45) Date of Patent: Mar. 11, 2014

(54) CHECK VALVE FOR AIRBAG AND AIRBAG DEVICE

(75) Inventors: Masayuki Taniguchi, Tokyo (JP); Masahiro Hasebe, Tokyo (JP); Hideaki Okamoto, Tokyo (JP)

(73) Assignee: Takata Corporation, Tokyo (JP)

( * ) Notice: Subject to any disclaimer, the term of this patent is extended or adjusted under 35 U.S.C. 154(b) by 85 days.

(21) Appl. No.: 13/154,157

(22) Filed: Jun. 6, 2011

(65) Prior Publication Data

US 2011/0298200 A1    Dec. 8, 2011

(30) Foreign Application Priority Data

Jun. 7, 2010   (JP) ................................ 2010-129683

(51) Int. Cl.
*B60R 21/232* (2011.01)
*B60R 21/2346* (2011.01)
*B60R 21/262* (2011.01)

(52) U.S. Cl.
USPC ........ 280/729; 137/855; 280/730.2; 280/736; 280/742; 280/743.1

(58) Field of Classification Search
USPC ........ 280/729, 730.2, 736, 742, 743.1, 743.2; 137/852, 855, 858
IPC ............ B60R 21/23,21/233, 21/2334, 21/2346, B60R 21/261, 21/262
See application file for complete search history.

(56) References Cited

U.S. PATENT DOCUMENTS

| | | | | |
|---|---|---|---|---|
| 3,642,303 A | * | 2/1972 | Irish et al. .................. | 280/730.1 |
| 5,697,641 A | * | 12/1997 | McGee et al. ............. | 280/743.1 |
| 6,213,499 B1 | * | 4/2001 | Khoudari et al. .......... | 280/730.2 |
| 6,394,487 B1 | * | 5/2002 | Heudorfer et al. ........... | 280/729 |
| 6,402,190 B1 | | 6/2002 | Heudorfer et al. | |
| 6,783,151 B2 | * | 8/2004 | Rasch et al. ................. | 280/729 |
| 6,802,529 B2 | * | 10/2004 | Takedomi et al. ........... | 280/729 |
| 6,811,184 B2 | * | 11/2004 | Ikeda et al. .................. | 280/742 |
| 6,866,293 B2 | * | 3/2005 | Ogata ........................ | 280/730.2 |
| 7,021,652 B2 | * | 4/2006 | Kumagai et al. ............ | 280/729 |
| 7,086,663 B2 | * | 8/2006 | Honda ....................... | 280/730.2 |
| 7,431,329 B2 | * | 10/2008 | Taguchi et al. .............. | 280/729 |
| 7,597,348 B2 | * | 10/2009 | Fukuda et al. ............. | 280/730.2 |

(Continued)

FOREIGN PATENT DOCUMENTS

| | | | | |
|---|---|---|---|---|
| EP | 2019001 A1 | * | 1/2009 | ........... B60R 21/233 |
| JP | H10-100827 A | | 4/1998 | |

(Continued)

*Primary Examiner* — Paul N Dickson
*Assistant Examiner* — Laura Freedman
(74) *Attorney, Agent, or Firm* — Fitch, Even, Tabin & Flannery, LLP

(57) ABSTRACT

Provided are a check valve for an airbag and an airbag device that can improve the reproducibility of the flow path blocking function while reducing the resistance upon inflation and deployment of the airbag and that can be applied to a place where a flow path is divided into a plurality of flow paths. A first embodiment of an airbag device according to the present invention has an airbag that is normally folded and that is inflated and deployed in an emergency, and an inflator that supplies gas to the airbag. The airbag has a plurality of inflation chambers, a duct portion disposed so as to connect the plurality of inflation chambers, and a check valve for an airbag having a tubular portion sewn to the duct portion, and tongue-shaped portions formed at the tip of the tubular portion.

6 Claims, 9 Drawing Sheets

(56) References Cited

U.S. PATENT DOCUMENTS

| | | | |
|---|---|---|---|
| 7,637,530 B2 * | 12/2009 | Yamaji et al. | 280/730.2 |
| 7,731,232 B2 * | 6/2010 | Higuchi | 280/739 |
| 7,883,112 B2 * | 2/2011 | Wold et al. | 280/743.1 |
| 7,926,838 B2 * | 4/2011 | Honda et al. | 280/729 |
| 8,052,168 B2 * | 11/2011 | Wipasuramonton et al. | 280/730.2 |
| 2011/0285119 A1 * | 11/2011 | Yamamoto et al. | 280/743.2 |

FOREIGN PATENT DOCUMENTS

| | | |
|---|---|---|
| JP | 2000-335355 A | 12/2000 |
| JP | 2001-063502 A | 3/2001 |
| JP | 2004-256017 A | 9/2004 |
| JP | 2004-268682 A | 9/2004 |
| JP | 2009-537360 A | 10/2009 |
| JP | 2009-255827 A | 11/2009 |
| JP | 2010-036870 A | 2/2010 |
| JP | 2010-143528 A | 7/2010 |

\* cited by examiner

FIG. 5
FIG. 5A
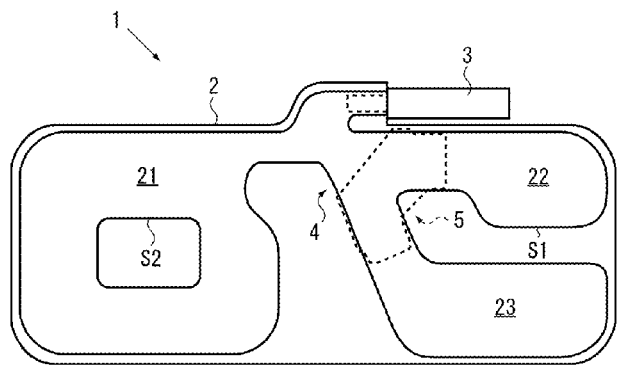
FIG. 5B
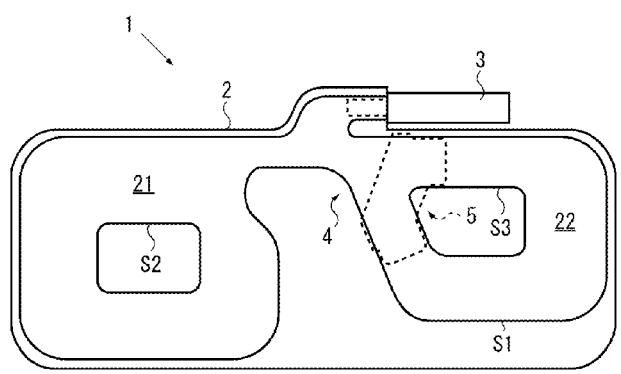
FIG. 5C
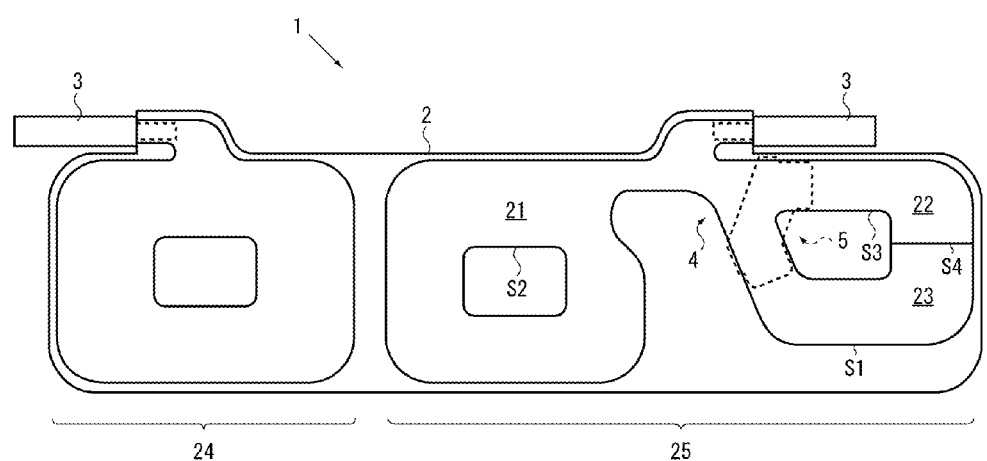

US 8,668,224 B2

CHECK VALVE FOR AIRBAG AND AIRBAG DEVICE

CROSS-REFERENCE TO RELATED APPLICATION

This application claims priority under 35 U.S.C. §119 to Japanese Patent Application No. JP2010-129683 filed on Jun. 7, 2010, the entire content of which is hereby incorporated herein by reference in its entirety.

FIELD OF THE INVENTION

The present invention relates to a check valve for an airbag and an airbag device used for a vehicle such as an automobile, and more specifically, it relates to a check valve for an airbag and an airbag device suitable for maintaining the internal pressure of an airbag having a plurality of inflation chambers.

BACKGROUND OF THE INVENTION

A vehicle such as an automobile is generally equipped with airbag devices for inflating and deploying airbags in the vehicle and absorbing the impact on occupants in an emergency such as a collision or sudden deceleration. Various types of airbag devices have been developed and are used, for example, an airbag device for a driver's seat mounted in the steering wheel, an airbag device for the front passenger seat mounted in the instrument panel, a side airbag device mounted in the side of the vehicle or in a seat, a curtain airbag device mounted in the upper parts of doors, and a knee airbag device for the knees of an occupant.

These airbag devices generally have an airbag and an inflator. The airbag is normally folded and that is inflated and deployed in an emergency, and the inflator supplies gas to the airbag. During a collision or sudden deceleration of the vehicle, gas is supplied from the inflator to the airbag to inflate and release the airbag in the vehicle, inflating and deploying the airbag.

In such airbag devices, there is often a need to dispose airbags (inflation chambers) that reduce impact or restrain occupants at a plurality of places, for example, to protect the head and the torso, the chest and the hip, occupants in a front seat and a rear seat, or an adult and a child. This need is high especially in side airbag devices and curtain airbag devices. In an airbag having a plurality of inflation chambers, when an occupant contacts the airbag, a gas flow occurs between the inflation chambers, thereby making it sometimes difficult to maintain sufficient internal pressure. In view thereof, check valves for an airbag described in Japanese Unexamined Patent Application Publication Nos. 2001-63502 and 2009-537360 have already been proposed.

In the check valve for an airbag described in Japanese Unexamined Patent Application Publication No. 2001-63502, a funnel-shaped (see FIG. 1 of Japanese Unexamined Patent Application Publication No. 2001-63502) or tubular (see FIG. 4 of Japanese Unexamined Patent Application Publication No. 2001-63502) flow path is formed by disposing an intermediate cloth between a first chamber and a second chamber. When gas flows in one direction, the check valve allows gas to flow. When gas flows in the opposite direction, the intermediate cloth blocks the flow path to prevent the flow of gas.

The check valve for an airbag described in Japanese Unexamined Patent Application Publication No. 2009-537360 is formed by a double layer formed in a flow duct. One layer of the double layer is pressed against the wall on the opposite side, thereby blocking the flow duct (see FIG. 2 of Japanese Unexamined Patent Application Publication No. 2009-537360).

SUMMARY OF THE INVENTION

However, in the funnel-shaped check valve described in Japanese Unexamined Patent Application Publication No. 2001-63502, the flow path on the downstream side of the gas flow becomes narrower upon inflation and deployment of the airbag and therefore slows the gas flow, leading to the problems of making it difficult to rapidly inflate and deploy the airbag and of making it necessary to increase the size of the inflator. In the tubular check valve, the tubular portion is turned inside out, or the tubular portion sticks to the wall surface while maintaining the tubular shape, leading to the problem of making it difficult to maintain the reproducibility of the function as a check valve.

In the check valve described in Japanese Unexamined Patent Application Publication No. 2009-537360, it is necessary to form a double layer by folding a base cloth forming a flow duct and to sew only one layer of the double layer (facing the wall) to the airbag with which the flow duct communicates; therefore, the check valve is difficult to manufacture.

In recent years, airbags are getting highly functional and complex, airbags requiring a plurality of inflation chambers are increasing, and sometimes it is necessary to divide a flow path into a plurality of flow paths like a junction of three roads. In such a case, in the above-described check valves described in Japanese Unexamined Patent Application Publication Nos. 2001-63502 and 2009-537360, it is necessary to dispose a check valve in each branch flow path, which is not efficient.

The present invention is made in view of the above-described problems. An object of the present invention is to provide a check valve for an airbag and an airbag device that can improve the reproducibility of the flow path blocking function while reducing the resistance upon inflation and deployment of the airbag and that can be applied to a place where a flow path is divided into a plurality of flow paths.

The present invention provides a check valve for an airbag disposed in an airbag device having an airbag that is normally folded and that is inflated and deployed in an emergency, and an inflator that supplies gas to the airbag, the airbag having a plurality of inflation chambers and at least one duct portion disposed so as to connect the plurality of inflation chambers, the check valve for an airbag comprising a tubular portion sewn to the duct portion, and a tongue-shaped portion formed at the tip of the tubular portion.

The present invention provides an airbag device comprising an airbag that is normally folded and that is inflated and deployed in an emergency, and an inflator that supplies gas to the airbag, wherein the airbag has a plurality of inflation chambers, at least one duct portion disposed so as to connect the plurality of inflation chambers, and a check valve for an airbag including a tubular portion sewn to the duct portion, and a tongue-shaped portion formed at the tip of the tubular portion.

In the above-described check valve for an airbag, the part of the tubular portion other than the sewn part may form the tongue-shaped portion. The length of the tongue-shaped portion may be equal to or greater than 30% of the length of half of the circumference of the duct portion. The duct portion and the tubular portion may each be formed of a pair of base cloths, the base cloths forming the tubular portion may each have seam allowance portions protruding from both sides thereof, and the tubular portion may be fixed to the duct portion by sewing the duct portion and the seam allowance portions together, with the base cloths forming the duct portion and the tubular portion laid one on top of another.

At least one pair of tongue-shaped portions may be formed. The tips of the pair of tongue-shaped portions may be joined together to form an annular shape.

The tongue-shaped portion may be formed in such a length that the folded part of the airbag does not overlap the tongue-shaped portion when the airbag is folded along a folding line perpendicular to the direction in which the duct portion extends.

The duct portion may have a plurality of branch flow paths, and the tubular portion may have a plurality of tongue-shaped portions that can be disposed in the branch flow paths. The tubular portion may have a first sealing portion where the end of the tubular portion opposite to the tongue-shaped portions and the duct portion are sewn together, and a second sealing portion where an intermediate portion between the plurality of tongue-shaped portions and the duct portion are sewn together, and the gap between the tubular portion and the duct portion may be sealed.

In the above-described check valve for an airbag and an airbag device according to the present invention, a tongue-shaped portion is formed at the tip of a tubular portion sewn to a duct portion, thereby increasing the resistance when gas flows in the opposite direction to push the tongue-shaped portion into the tubular portion easily. If the check valve for an airbag according to the present invention is disposed, the flow path does not easily become narrower upon inflation and deployment of the airbag, thereby reducing the resistance when the airbag inflates and deploys. In addition, the check valve does not easily stick to the wall surface of the duct portion while maintaining the tubular shape, thereby improving the reproducibility of the flow path blocking function of the check valve.

When the part of the tubular portion other than the sewn part forms the tongue-shaped portion, the whole valve of the check valve can be formed by at least one pair of tongue-shaped portions. Even if one of the tongue-shaped portions sticks to the wall surface of the duct portion, the other tongue-shaped portion deforms so as to cover the one tongue-shaped portion and can block the flow path; therefore, the reproducibility of the flow path blocking function of the check valve can be further improved.

By making the length of the tongue-shaped portion equal to or greater than 30% of the length of half of the circumference of the duct portion, the length of the tongue-shaped portion can be regulated so that the tongue-shaped portion has the area required to block the duct portion when gas flows backward, and the tongue-shaped portion can be prevented from turned inside out when gas flows backward.

By forming the tubular portion from a pair of base cloths, forming seam allowance portions in the tubular portion, and sewing the seam allowance portions together with the base cloths forming the airbag (duct portion), the check valve can be easily fixed to the airbag.

By forming the tongue-shaped portion in an annular shape, the tongue-shaped portion can be easily disposed in the gas flow path, the resistance can be increased when gas flows in the opposite direction, and the tongue-shaped portion is easily pushed into the tubular portion.

By preventing the folded part of the airbag from overlapping the tongue-shaped portion when the airbag is folded, the package can be prevented from increasing in volume when the airbag is housed.

When the duct portion has a plurality of branch flow paths, branch check valves of a single check valve can be disposed in the plurality of branch flow paths by dividing the tubular portion into tongue-shaped portions and disposing the tongue-shaped portions in the branch flow paths requiring check valves, which is efficient and more adaptive to increasingly highly-functional and complex airbag.

By forming a first and second sealing portions in the tubular portion, the gap between the tubular portion and the duct portion can be sealed to block the loophole easily, thereby improving the function and reproducibility of the check valve.

BRIEF DESCRIPTION OF THE DRAWINGS

FIGS. 1A-1C show a first embodiment of an airbag device according to the present invention, wherein FIG. 1A is a schematic side view, FIG. 1B is a sectional view taken along line B-B of FIG. 1A, and FIG. 1C is a sectional view taken along line C-C of FIG. 1A.

FIGS. 2A-2C show a check valve for an airbag in the first embodiment, wherein FIG. 2A is an overall view, FIG. 2B shows a state where gas is being supplied, and FIG. 2C shows a state where gas is flowing backward.

FIGS. 3A-3C show the procedure for folding an airbag in the first embodiment, wherein FIG. 3A shows the first step, FIG. 3B shows the second step, and FIG. 3C shows the third step.

FIGS. 4A and 4B show a second embodiment of an airbag device according to the present invention, wherein FIG. 4A is a partial schematic side view, FIG. 4B is a sectional view taken along line B-B of FIG. 4A.

FIGS. 5A-5C show other embodiments of airbag devices according to the present invention, wherein FIG. 5A shows a third embodiment, FIG. 5B shows a fourth embodiment, and FIG. 5C shows a fifth embodiment.

FIGS. 6A and 6B show other embodiments of airbag devices according to the present invention, wherein FIG. 6A shows a sixth embodiment, and FIG. 6B shows a seventh embodiment.

FIGS. 7A and 7B show the operation of a check valve for an airbag in the sixth embodiment, wherein FIG. 7A shows a state where gas is being supplied, and FIG. 7B shows a state where gas is flowing backward.

FIGS. 8A-8C show modifications of the check valve for an airbag in the sixth embodiment, wherein FIG. 8A shows a first modification, FIG. 8B shows a second modification, and FIG. 8C shows a state where gas is flowing backward of the first modification or the second modification.

FIGS. 9A and 9B show modifications of the check valve for an airbag in the first embodiment, wherein FIG. 9A shows a first modification, and FIG. 9B shows a second modification.

DETAILED DESCRIPTION OF THE PREFERRED EMBODIMENTS

Figure 1A:
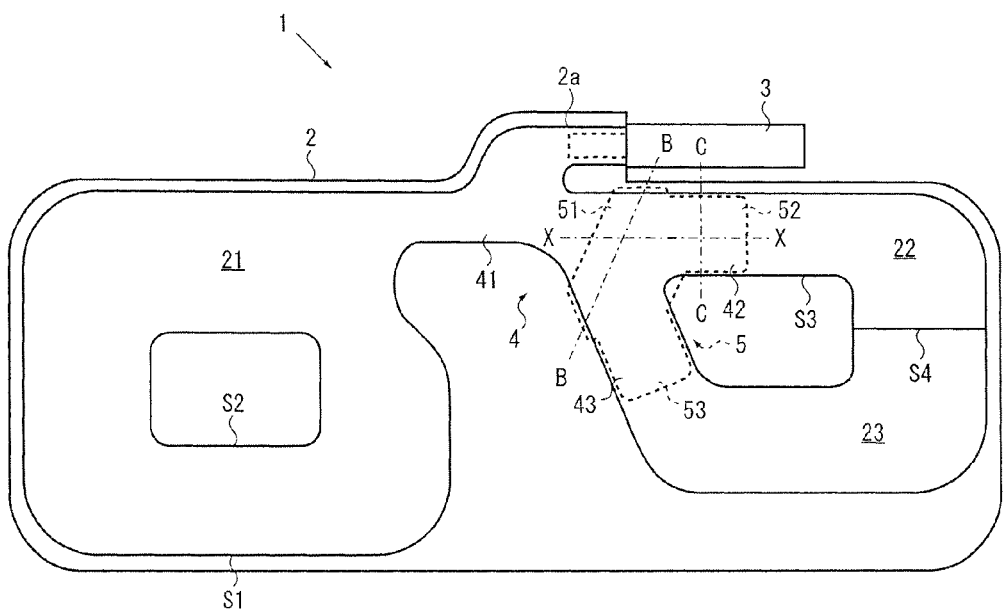
Figure 1B:
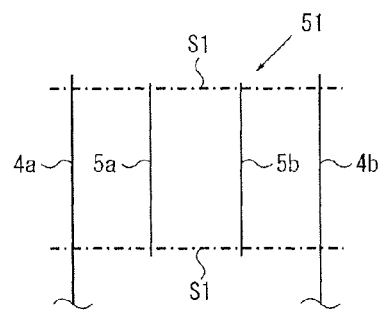
Figure 1C:
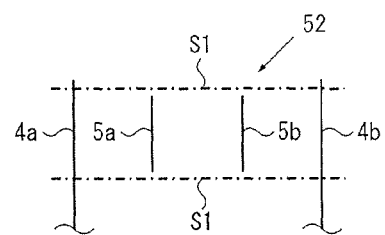
Figure 2A:
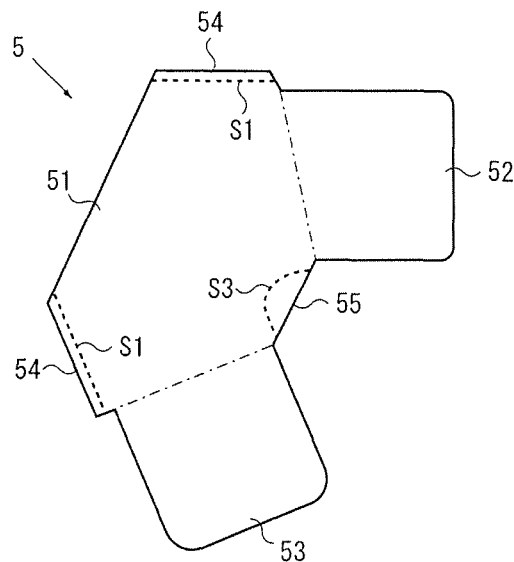
Figure 2B:
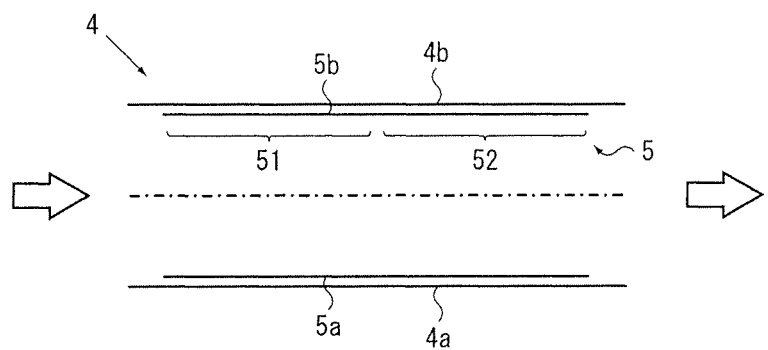
Figure 2C:
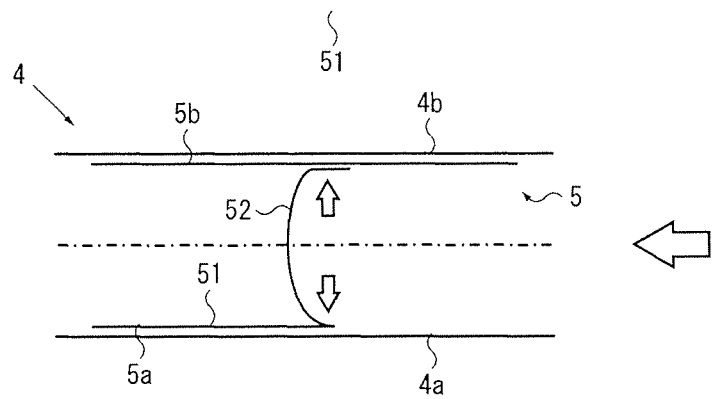
Figure 3A:
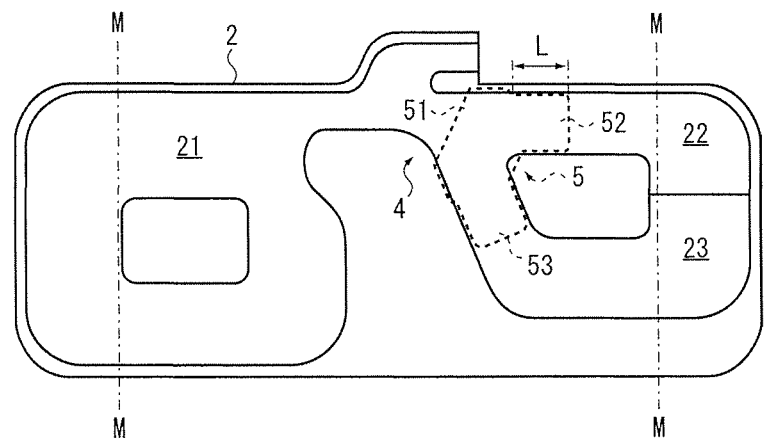
Figure 3B:
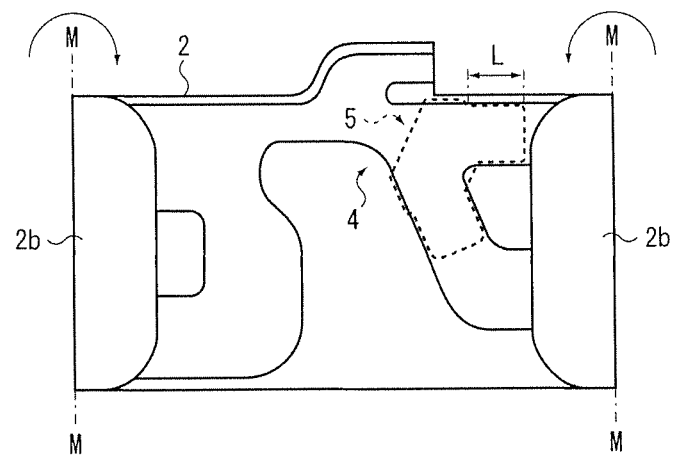
Figure 3C:
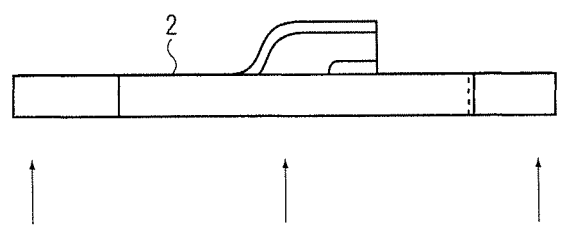

Embodiments of the present invention will be described with reference to FIGS. 1A to 8C. FIG. 1 shows a first embodiment of an airbag device according to the present invention, wherein FIG. 1A is a schematic side view, FIG. 1B is a sectional view taken along line B-B of FIG. 1A, and FIG. 1C is a sectional view taken along line C-C of FIG. 1A. FIG. 2 shows a check valve for an airbag in the first embodiment, wherein FIG. 2A is an overall view, FIG. 2B shows a state where gas is being supplied, and FIG. 2C shows a state where gas is flowing backward. FIG. 3 shows the procedure for folding an airbag in the first embodiment, wherein FIG. 3A shows the first step, FIG. 3B shows the second step, and FIG. 3C shows the third step.

As shown in FIG. 1A, a first embodiment of an airbag device 1 according to the present invention has an airbag 2 that is normally folded and that is inflated and deployed in an emergency and an inflator 3 that supplies gas to the airbag 2. The airbag 2 has a plurality of inflation chambers (for example, first, second, and third inflation chambers 21, 22, 23), a duct portion 4 disposed so as to connect the plurality of inflation chambers 21 to 23, and a check valve 5 for an airbag having a tubular portion 51 sewn to the duct portion 4 and tongue-shaped portions 52, 53 formed at the tip of the tubular portion 51.

The airbag 2 is a so-called curtain airbag and is housed along the upper parts of side windows (for example, a roof side rail) of the vehicle. FIG. 1A shows the state where the airbag 2 is deployed in a plane.

The airbag 2 has a connecting port 2a to which an inflator 3 is connected in the upper part of the substantially middle part thereof. A plurality of inflation chambers 21 to 23 are disposed on both sides of the connecting port 2a. The inflation chambers include, for example, a first inflation chamber 21 shown on the left side of the figure (in the front of the vehicle) and second and third inflation chambers 22, 23 shown on the right side of the figure (in the rear of the vehicle). The shapes of the inflation chambers 21 to 23 and the connecting port 2a are generally formed by seams S1 to S4. The seams S1 to S4 are parts where a pair of base cloths forming the airbag 2 are joined with stitches, adhesive, by thermal welding, or a combination thereof.

The first inflation chamber 21 is, for example, a portion that reduces the impact on the head of a passenger in a front seat of the vehicle. An annular seam S2 is formed in the middle so that the first inflation chamber 21 can inflate annularly. As described above, by partitioning the inflating part with the seam S2, the airbag 2 can be efficiently inflated and deployed for a plurality of objects, for example, an adult and a child, or the head and the shoulder. The inside of the annular seam S2 forms a non-inflating portion.

The second and third inflation chambers 22, 23 are, for example, portions that reduce the impact on the head of an occupant in a rear seat of the vehicle. An annular seam S3 similar to the seam S2 is formed in the middle so that the second and third inflation chambers 22, 23 can inflate substantially annularly. In addition, a seam S4 for separating the second and third inflation chambers 22, 23 is formed. In the airbag 2 with the configuration shown in the figure, it is generally difficult for gas of the inflator 3 to flow into the second and third inflation chambers 22, 23. In view thereof, the seam S4 separating the second and third inflation chambers 22, 23 is formed in order to rapidly supply gas to both of the second and third inflation chambers 22, 23 and to maintain a constant internal pressure thereof. For example, the second inflation chamber 22 is deployed for the head of a tall occupant, and the third inflation chamber 23 is deployed for the head of a short occupant.

The inflator 3 has a substantially cylindrical shape, and gas ports are formed in the peripheral surface of the tip thereof located in the airbag 2. The inflator 3 is connected to an ECU (electronic control unit, not shown) and is controlled on the basis of the measurements of an acceleration sensor or the like. In an emergency when the ECU detects or predicts a collision or sudden deceleration of the vehicle, the inflator 3 is ignited by an ignition current from the ECU, burns an agent housed in the inflator 3, produces gas, and supplies gas to the airbag 2. The shape and method of fixation of the inflator 3 are not limited to those shown and can be selected from conventional ones.

The duct portion 4 is a flow path connecting the first, second and third inflation chambers 21, 22, 23. The duct portion 4 includes a first duct portion 41 connecting the first inflation chamber 21 with the second and third inflation chambers 22, 23, a second duct portion 42 connecting the second inflation chamber 22 with the first and third inflation chambers 21, 23, and a third duct portion 43 connecting the third inflation chamber 23 with the first and second inflation chambers 21, 22, and is formed in a Y shape. Gas for inflating the second and third inflation chambers 22, 23 is sent from the first duct portion 41 side; therefore the second and third duct portions 42, 43 correspond to branch flow paths.

As shown in FIGS. 1A and 2A, the check valve 5 for an airbag has a tubular portion 51 fixed to the duct portion 4, a tongue-shaped portion 52 extended from the tubular portion 51 and located in the second duct portion 42, and a tongue-shaped portion 53 extended from the tubular portion 51 and located in the third duct portion 43. That is, the duct portion 4 has a plurality of branch flow paths (second and third duct portions 42, 43), and the tubular portion 51 has a plurality of tongue-shaped portions 52, 53 that can be disposed in the branch flow paths (the second and third duct portions 42, 43).

As shown in FIGS. 1B and 1C, the duct portion 4 (airbag 2) is formed by a pair of base cloths 4a, 4b, and the check valve 5 for an airbag is also formed by a pair of base cloths 5a, 5b. The base cloths 5a, 5b forming the tubular portion 51 each have seam allowance portions 54, 54 protruding from both sides thereof. By sewing the duct portion 4 and the seam allowance portions 54, 54 together with the seam S1, with the base cloths 4a, 4b forming the duct portion 4 and the base cloths 5a, 5b forming the tubular portion 51 laid one on top of another, the tubular portion 51 is fixed to the duct portion 4. In FIGS. 1B and 1C, the alternate long and short dash line means stitches (seam S1). For the convenience of the description, the base cloths 4a, 4b, 5a, and 5b depicted in the figures are spaced.

As shown in FIG. 2A, the tubular portion 51 has an intermediate portion 55 formed between the pair of tongue-shaped portions 52, 53. As with the seam allowance portions 54, the intermediate portion 55 is sewn with the seam S3 together with the base cloths 4a, 4b forming the duct portion 4; therefore, both sides of each of the tongue-shaped portions 52, 53 are fixed to the duct portion 4 by the seams S1, S3. The tongue-shaped portions 52, 53 are each formed by the whole of the part on the tip side of the part fixed to the duct portion 4 (the part shown by the alternate long and short dash line in the figure). That is, the parts other than the sewn part of the tubular portion 51 form the tongue-shaped portions 52, 53.

According to the configuration, as shown in FIG. 1C, the tongue-shaped portions 52 (53) are not connected to the base cloths 4a, 4b forming the duct portion 4 and form free ends; therefore, the free ends of the tongue-shaped portions 52, 53 are easily turned by a gas flow, the resistance when gas flows in the opposite direction can be increased, and the tongue-shaped portions 52, 53 are easily pushed into the tubular portion 51.

FIGS. 2B and 2C are sectional views taken along line X-X of FIG. 1A. FIG. 2B shows a state where gas is being supplied from the first inflation chamber 21 side to the second inflation chamber 22, and FIG. 2C shows a state where gas is flowing backward from the second inflation chamber 22 to the first inflation chamber 21 side. In each figure, the duct portion 4 and the check valve 5 for an airbag are spaced, for the convenience of the description.

As shown in FIG. 2B, gas is sent from the fixed end side of the tongue-shaped portions 52 during gas supply; therefore, the free ends of the tongue-shaped portions 52 are pressed against the wall surface of the duct portion 4 by gas, a flow path having substantially the same diameter as the duct portion 4 can be ensured, and gas can be supplied to the second inflation chamber 22.

As shown in FIG. 2C, gas is sent from the free end side of the tongue-shaped portions 52 while gas flows backward; therefore, the free ends of the tongue-shaped portions 52 are pushed by gas to the fixed end side. At this time, typically, both of the pair of tongue-shaped portions 52 are pushed into the tubular portion 51, the duct portion 4 is blocked by the tongue-shaped portions 52, and the flow path is blocked. As shown in the figure, one of the tongue-shaped portions 52 sometimes deforms so as to cover the other tongue-shaped portion 52, thereby blocking the duct portion 4. This blocking can be performed because the part that deforms to block the flow path is not a tubular body but a pair of tongue-shaped portions 52. Even if one of the tongue-shaped portions 52 sticks to the wall surface of the duct portion 4 (for example, the base cloth 4a), the flow path can be blocked with the other tongue-shaped portion 52. Thus, the reproducibility of the flow path blocking function can be improved.

In the airbag device 1 having the above-described check valve 5 for an airbag, in an emergency such as a collision or sudden deceleration of the vehicle, gas is supplied from the inflator 3 to the airbag 2, and the first, second and third inflation chambers 21, 22, 23 inflate and deploy. For example, when an occupant contacts the second inflating chamber 22, gas in the second inflating chamber 22 is pushed to move from the second inflating chamber 22 to the first inflating chamber 21 or the third inflating chamber 23. At this time, the tongue-shaped portions 52 turn inward to block the second duct portion 42, thereby maintaining the internal pressure of the second inflating chamber 22 and reducing the impact on the occupant effectively.

The above-described airbag 2 is folded, for example, in the manner shown in FIG. 3 and is housed in the upper parts of side windows of the vehicle (for example, in a roof side rail). At this time, the tongue-shaped portions 52 are formed in such a length L that the folded part 2b of the airbag 2 does not overlap the tongue-shaped portions 52 when the airbag 2 is folded along the folding lines M-M in a direction perpendicular to the direction in which the first duct portion 41 extends. When the tongue-shaped portions 53 are longer than the tongue-shaped portions 52 in the longitudinal direction of the airbag 2, the tongue-shaped portions 53 are formed in such a length L that the folded part 2b of the airbag 2 does not overlap the tongue-shaped portions 53.

The first step shown in FIG. 3A is a step of deploying the airbag 2 in a plane. If the length in the longitudinal direction of the airbag 2 is reduced, for example, in order to store the parts of the airbag 2 inflated and deployed along the A and C pillars in the straight part of a roof side rail, the airbag 2 is folded along the folding lines M-M.

The second step shown in FIG. 3B is a step of folding both ends of the airbag 2 inward to reduce the length in the longitudinal direction. The folding lines M-M are set, for example, in the direction perpendicular to the direction in which the duct portion 4 (first duct portion 41) extends. The airbag 2 is Z-folded or accordion folded, and the folded parts 2b are folded onto the part of the airbag 2 inside them. At this time, the length L of the tongue-shaped portions 52, 53 is regulated so that the folded part 2b and the check valve 5 for an airbag do not overlap. This is because if the tongue-shaped portions 52, 53 and the folded part 2b overlap, the thickness of the overlapped part of the airbag 2 increases, the package volume of the airbag 2 increases, and the airbag 2 may not be able to be housed in a casing or the like.

The third step shown in FIG. 3C is a step of finally rolling the airbag 2. In this step, the airbag 2 is folded into an elongate package shape and is housed in a cylindrical casing (not shown). The casing is made, for example, of fabric, resin, or metal.

Figure 4A:
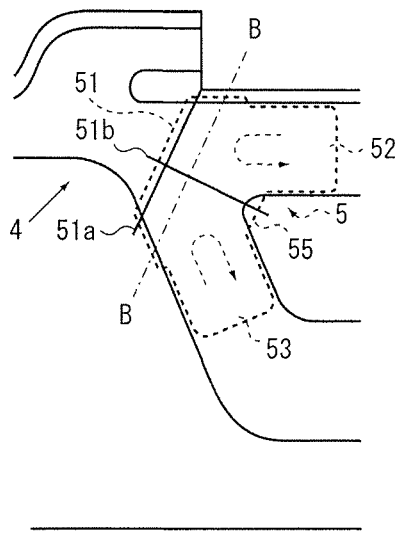
Figure 4B:
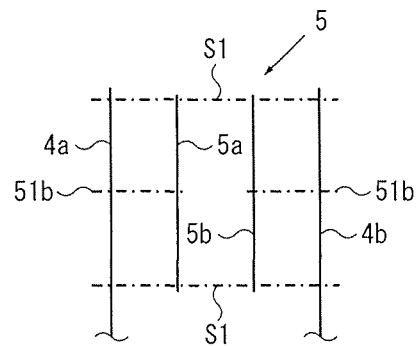
Figure 4C:
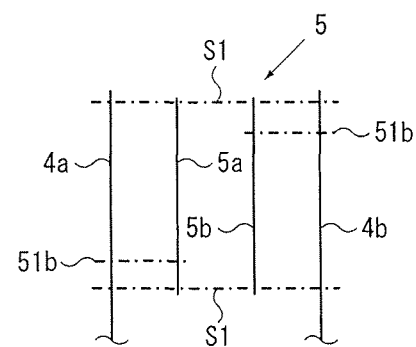
FIG. 4C shows a modification of the second embodiment.

Next, other embodiments of airbag devices 1 according to the present invention will be described. FIGS. 4A-4C show a second embodiment of an airbag device according to the present invention, wherein FIG. 4A is a partial schematic side view, FIG. 4B is a sectional view taken along line B-B of FIG. 4A, and FIG. 4C shows a modification of the second embodiment. FIGS. 5A-5C show other embodiments of airbag devices according to the present invention, wherein FIG. 5A shows a third embodiment, FIG. 5B shows a fourth embodiment, and FIG. 5C shows a fifth embodiment. In each figure, the same reference numerals will be used to designate the same components as those in the above-described first embodiment, and the redundant description thereof will be omitted.

In the second embodiment shown in FIG. 4, the gap between the duct portion 4 and the check valve 5 for an airbag is sealed. Specifically, as shown in FIG. 4A, the tubular portion 51 has first sealing portions 51a where the end of the tubular portion 51 opposite to the tongue-shaped portions 52, 53 and the duct portion 4 are sewn together, and second sealing portions 51b where the intermediate portion 55 between the plurality of tongue-shaped portions 52, 53 and the duct portion 4 are sewn together, and the gap between the tubular portion 51 and the duct portion 4 is sealed.

As shown in FIG. 4B, if the duct portion 4 is formed by a pair of base cloths 4a, 4b and the tubular portion 51 (check valve 5 for an airbag) is formed by a pair of base cloths 5a, 5b, the base cloth 4a of the duct portion 4 and the base cloth 5a of the tubular portion 51 are joined by the first and second sealing portions 51a, 51b, and the base cloth 4b of the duct portion 4 and the base cloth 5b of the tubular portion 51 are joined by the first and second sealing portions 51a, 51b.

As described above, by joining the duct portion 4 and the check valve 5 for an airbag with the first and second sealing portions 51a, 51b, as shown in FIG. 4A, a dead end can be formed between the duct portion 4 and the check valve 5 for an airbag, thereby reducing gas passing through the gap; therefore, the loophole in the airbag 2 can be easily blocked, and the function and reproducibility of the check valve 5 for an airbag can be improved.

As in the modification of the second embodiment shown in FIG. 4C, the second sealing portions 51b may be offset from each other. That is, the positions of the second sealing portions 51b can be arbitrarily set in view of the shape and usage pattern of the airbag 2, the balance between the second and third inflation chambers 22, 23, and so forth. In some cases, a second sealing portion 51b may be formed only on one side.

In the third embodiment shown in FIG. 5A, the second and third inflation chambers 22, 23 are separated by the seam S1. The shapes and volumes of the plurality of inflation chambers 21 to 23 are not limited to those shown, and can be arbitrarily set according to the type and usage pattern of the airbag 2. Although not shown in the figure, four or more inflation chambers may be formed, the check valve 5 for an airbag may have three or more tongue-shaped portions, and when the duct portion 4 has three or more branch flow paths, tongue-shaped portions may be disposed only in two of the three or more branch flow paths.

In the fourth embodiment shown in FIG. 5B, the second and third inflation chambers 22, 23 shown in the first embodiment communicate with each other. Although an airbag 2 with the configuration has only two inflation chambers (first and second inflation chambers 21, 22), since the second inflating chamber 22 is formed annularly by the seam S3, the airbag 2 has the same duct portion 4 as the first embodiment; therefore, the same check valve 5 for an airbag as the first embodiment can be applied.

In the fifth embodiment shown in FIG. 5C, the check valve 5 for an airbag according to the first embodiment is applied to an airbag 2 for three rows of seats. The shown airbag 2 for three rows of seats is divided into a front airbag 24 and a rear airbag 25. The front airbag 24 is disposed for the first row of seats. The rear airbag 25 is disposed for the second and third rows of seats. The airbag 2 shown in the first embodiment corresponds to the rear airbag 25, to which the same check valve 5 for an airbag can be applied.

Figure 6A:
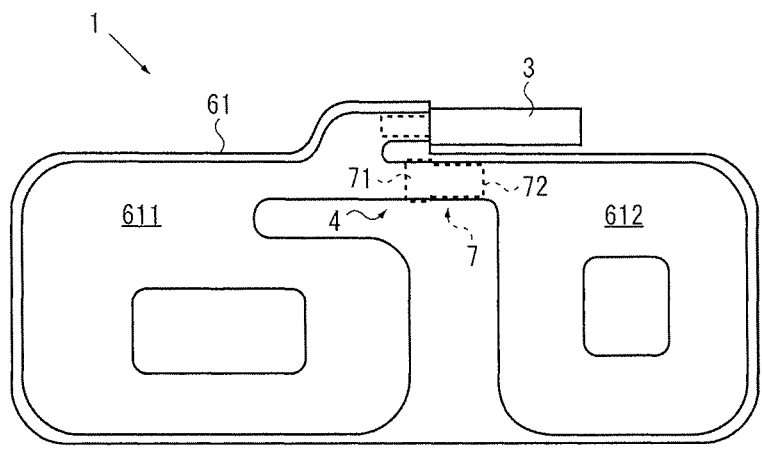
Figure 6B:
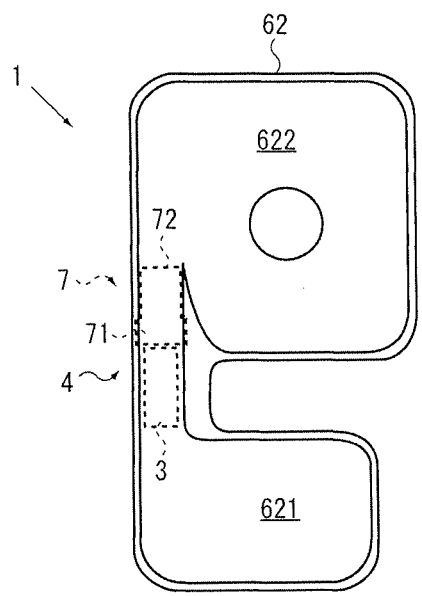
Figure 7A:
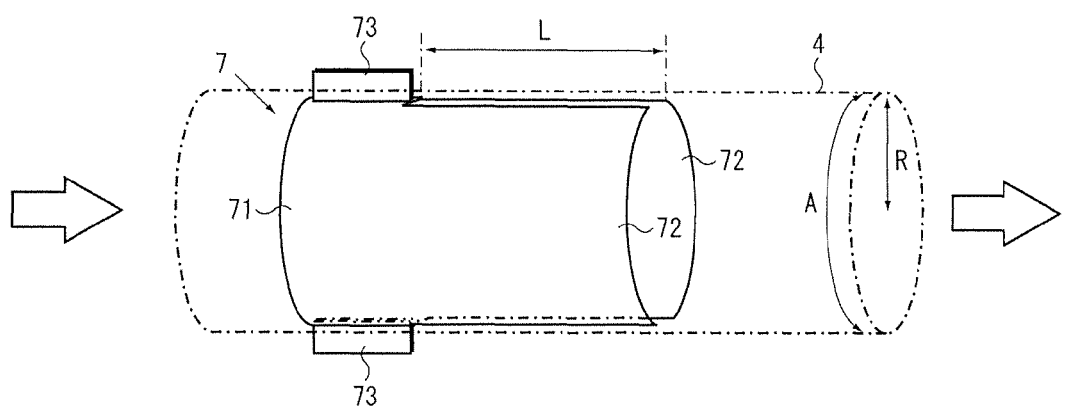
Figure 7B:
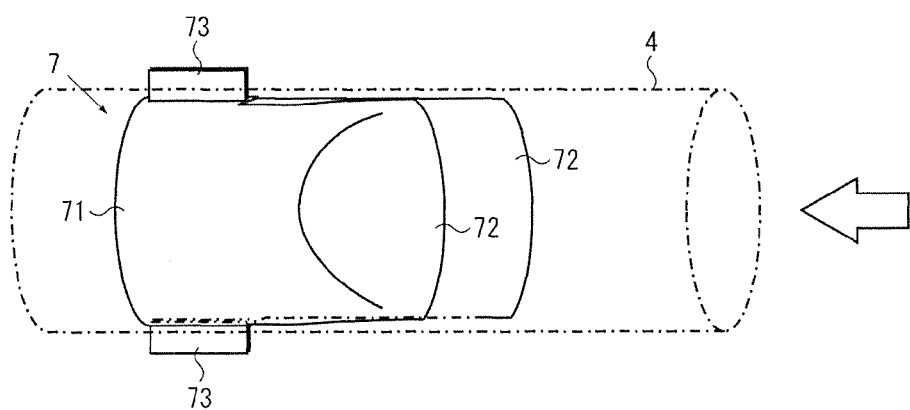
Figure 8A:
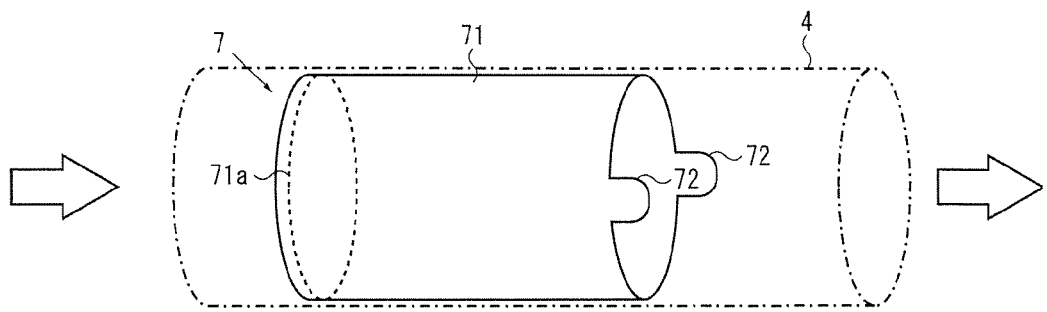
Figure 8B:
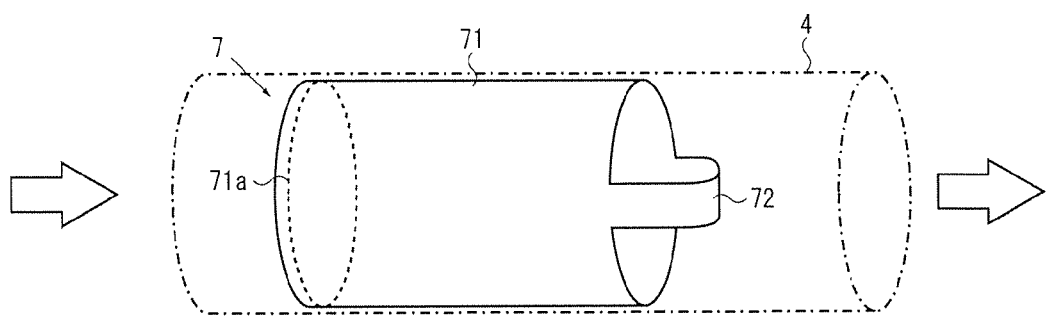
Figure 8C:
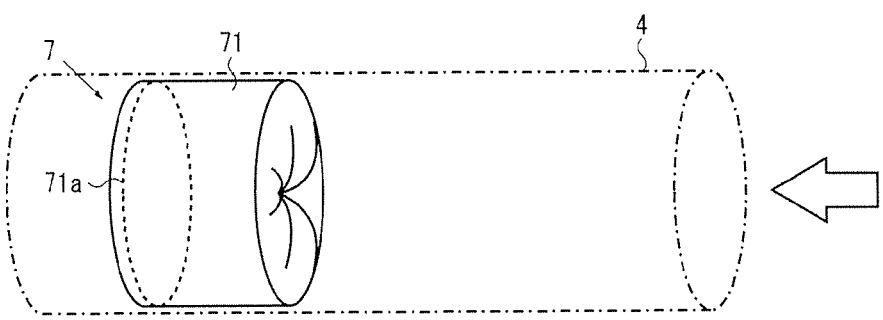

Next, a case where a check valve for an airbag according to the present invention is applied to a duct portion 4 without branch flow paths will be described with reference to FIGS. 6A to 8C. FIGS. 6A and 6B show other embodiments of airbag devices according to the present invention, wherein FIG. 6A shows a sixth embodiment, and FIG. 6B shows a seventh embodiment. FIGS. 7A and 7B show the operation of a check valve for an airbag in the sixth embodiment, wherein FIG. 7A shows a state where gas is being supplied, and FIG. 7B shows a state where gas is flowing backward. FIGS. 8A-8C show modifications of the check valve for an airbag in the sixth embodiment, wherein FIG. 8A shows a first modification, FIG. 8B shows a second modification, and FIG. 8C shows a state where gas is flowing backward of the first modification or the second modification.

In the sixth embodiment shown in FIG. 6A, a check valve 7 for an airbag is disposed in a curtain airbag 61 having a duct portion 4 substantially without branch flow paths. The shown curtain airbag 61 has first and second inflating chambers 611, 612, and has a duct portion 4 disposed so as to connect the first and second inflating chambers 611, 612.

As shown in FIG. 7A, the check valve 7 for an airbag has a tubular portion 71 sewn to the duct portion 4, and tongue-shaped portions 72 formed at the tip of the tubular portion 71. The check valve 7 for an airbag is formed by a pair of base cloths one of which is placed on top of the other. The tubular portion 71 has seam allowance portions 73. By sewing the seam allowance portions 73 together with the base cloths forming the duct portion 4, the check valve 7 for an airbag is fixed in the duct portion 4. The tongue-shaped portions 72 are formed by the parts other than the sewn part of the tubular portion 71, and are formed by a pair of base cloths. The tubular portion 71 side of each tongue-shaped portion 72 forms a fixed end, and the tip side thereof forms a free end.

Accordingly, as shown in FIG. 7A, gas is sent from the fixed end side of the tongue-shaped portions 72 during gas supply; therefore, the free ends of the tongue-shaped portions 72 are pressed against the wall surface of the duct portion 4 by gas, and a flow path having substantially the same diameter as the duct portion 4 can be ensured.

As shown in FIG. 7B, gas is sent from the free end side of the tongue-shaped portions 72 while gas flows backward; therefore, the free ends of the tongue-shaped portions 72 are pushed by gas to the fixed end side. At this time, typically, both of the pair of tongue-shaped portions 72 are pushed into the tubular portion 71, and the duct portion 4 is blocked by the tongue-shaped portions 72. Sometimes, as shown in the figure, one of the tongue-shaped portions 72 deforms so as to cover the other tongue-shaped portion 72, thereby blocking the duct portion 4; therefore, even if one of the tongue-shaped portions 72 sticks to the wall surface of the duct portion 4, the flow path can be blocked with the other tongue-shaped portion 72. Thus, the reproducibility of the flow path blocking function can be improved.

As shown in FIG. 7A, the length L of the tongue-shaped portions 72 is regulated in relation to the radius R of the duct portion 4 so that the tongue-shaped portions 72 have the area required to block the duct portion 4 when gas flows backward. For example, in order to block at least half of the flow path in a state where the tongue-shaped portion 72 is sticking to the wall surface of the duct portion 4, a relationship of length L≥radius R is required. When the length A of half of the circumference of the duct portion 4 (the width of the flow path in the state where the duct portion 4 is flattened) is known, since A=πR, a relationship of L≥A/π is required. Specifically, when the length A of half of the circumference of the duct portion 4 is 100 mm, in theory, it is preferable that the length L of the tongue-shaped portions 72 be about 31.8 mm or more. In view of the thickness of the base cloths of the tongue-shaped portions 72, how the tongue-shaped portions 72 overlap when they deform, and so forth, the length L of the tongue-shaped portions 72 may actually be equal to or greater than 30% of the length A of half of the circumference of the duct portion 4. By such regulation, the tongue-shaped portions 72 can be prevented from turned inside out when gas flows backward.

In the seventh embodiment shown in FIG. 6B, a check valve 7 for an airbag is disposed in a side airbag 62 having a duct portion 4 without branch flow paths. The side airbag 62 is disposed, for example, in the side of an automotive seat, and is an airbag for inflating and deploying the side airbag 62 from the inside of an automotive seat to the inside of the vehicle and reducing mainly the impact on the chest and hip of an occupant in an emergency such as a collision or sudden deceleration of the vehicle. Such a side airbag 62 has a first inflating chamber 621 that reduces the impact on the hip and a second inflating chamber 622 that reduces the impact on the chest, and has a duct portion 4 disposed so as to connect the first and second inflating chambers 621, 622. The check valve 7 for an airbag is the same as that shown in FIG. 6A.

In the first modification of the check valve 7 for an airbag shown in FIG. 8A, the whole check valve is formed by a tubular portion 71, and small tongue-shaped portions 72 are formed at the tip thereof. The rear end of the tubular portion 71 is sewn to the duct portion 4 with stitches 71a. Also in this configuration, the tongue-shaped portions 72 have free ends, the free ends are easily turned by a gas flow, the resistance when gas flows in the opposite direction can be increased, and the tongue-shaped portions 72 are easily pushed into the tubular portion 71.

In the second modification of the check valve 7 for an airbag shown in FIG. 8B, the tips of the pair of tongue-shaped portions 72 shown in the first modification are joined together to form an annular shape. To form tongue-shaped portions 72 in an annular shape, the tips of the tongue-shaped portions 72 may be sewn together, or both ends of a strip-shaped base cloth may be sewn to the tubular portion 71. In this configuration, the middle part of the tongue-shaped portion 72 is exposed in the flow path, thereby increasing the resistance when gas flows in the opposite direction to push the tongue-shaped portion 72 into the tubular portion 71 easily.

If the whole check valve is formed by a tubular portion 71, and when gas flows backward, as shown in FIG. 8C, first the tongue-shaped portion 72 and then the tubular portion 71 is squashed and blocks the flow path of the duct portion 4. In the above-described first and second modifications of the check valve 7 for an airbag, as with the check valve 7 for an airbag shown in FIG. 7A, the tubular portion 71 may have seam allowance portions and may be sewn together with the base cloths.

Figure 9A:
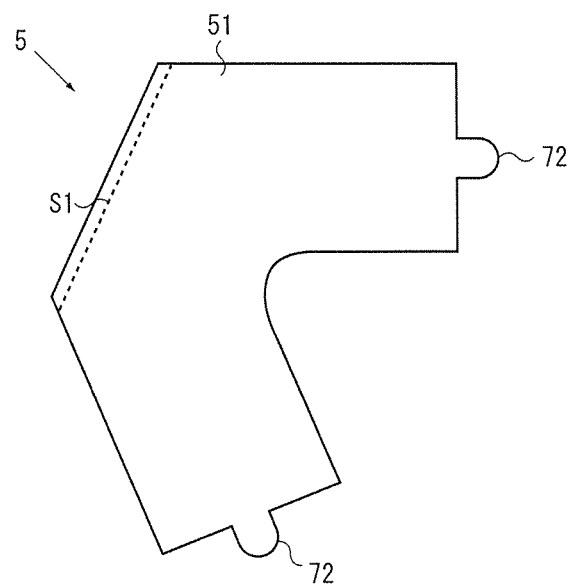
Figure 9B:
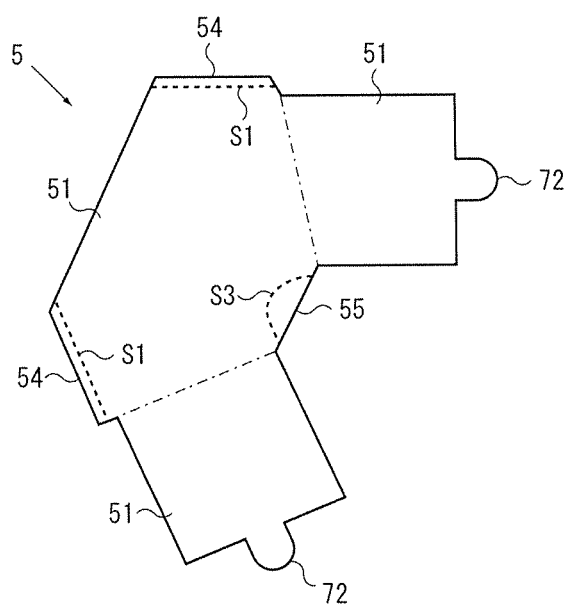

The above-described small tongue-shaped portions 72 can also be applied to the check valve for an airbag in the first embodiment shown in FIG. 1. FIGS. 9A and 9B show modifications of the check valve for an airbag in the first embodiment, wherein FIG. 9A shows a first modification, and FIG. 9B shows a second modification.

In the check valve for an airbag in the first embodiment shown in FIG. 1, the tubular portion 51 has large tongue-shaped portions 52, 53. In the modifications shown in FIGS. 9A and 9B, the parts corresponding to the tongue-shaped portions 52, 53 are integrated with the tubular portion 51 so as to form a bifurcated tubular portion 51, and small tongue-shaped portions 72 are formed at the tip of each branch. By such a configuration, the same advantageous effect as the above-described embodiments can be achieved.

In FIG. 9A, the end of the bifurcated tubular portion 51 opposite to the branches is sewn to the base cloths of the airbag (duct portion 4) with the seam 51. In FIG. 9B, each branch of the bifurcated tubular portion 51 is formed in a tubular shape, and the base cloths (seam allowance portions) at the end of the bifurcated tubular portion 51 opposite to the branches are sewn with the seam 51 together with the airbag (duct portion 4) so as to be formed in a tubular shape. In this case, the intermediate portion 55 is also fixed to the duct portion 4 by the seam S3.

It goes without saying that the present invention is not limited to the above-described embodiments, the present invention can be applied to all airbags having a duct portion 4, and various changes may be made therein without departing from the spirit of the present invention, for example, the first embodiment to the seventh embodiment may be combined.

What is claimed is:

1. A check valve for an airbag disposed in an airbag device having an airbag that is normally folded and that is inflated and deployed in an emergency, and an inflator that supplies gas to the airbag, the airbag having first, second and third inflation chambers, and further having a duct portion including a first duct portion connecting with the first inflation chamber, a second duct portion connecting with the second inflation chamber and a third duct portion connecting with the third inflation chamber, the check valve for an airbag comprising:

a tubular portion fixed to the first duct portion; and a pair of tongue-shaped portions connected to and extending in different directions from the tubular portion with one tongue-shaped portion located in the second duct portion and the other tongue-shaped portion located in the third duct portion, wherein the tubular portion and the duct portion have a gap therebetween, and the tubular portion has an end opposite to the tongue-shaped portions and a first sealing portion where the end of the tubular portion opposite to the tongue-shaped portions and the duct portion are sewn together, and a second sealing portion where an intermediate portion between the plurality of tongue-shaped portions and the duct portion are sewn together, and the gap between the tubular portion and the duct portion is sealed.

2. The check valve for an airbag according to claim 1, wherein the length of at least one of the pair of tongue-shaped portions is equal to or greater than 30% of the length of half of the circumference of the corresponding one of the second and third duct portions.

3. The check valve for an airbag according to claim 1, wherein the duct portion and the tubular portion are each formed of a pair of base cloths, and the tubular portion is fixed to the duct portion by sewing together the pair of base cloths forming the duct portion and the pair of base cloths forming the tubular portion.

4. The check valve for an airbag according to claim 1, wherein the tongue-shaped portions each include a tip, and each of the tips of the pair of tongue-shaped portions has an annular shape.

5. The check valve for an airbag according to claim 1, wherein at least one of the pair of tongue-shaped portions is formed in such a length that when the airbag is folded along a folding line perpendicular to the direction in which the second or third duct portion extends to form a folded part of the airbag, the folded part of the airbag does not overlap the tongue-shaped portion.

6. An airbag device comprising:

an airbag that is normally folded and that is inflated and deployed in an emergency; and an inflator that supplies gas to the airbag, wherein the airbag has the check valve for an airbag according to claim 1.

* * * * *